L. DUFOUR.
SHOCK ABSORBER.
APPLICATION FILED APR. 29, 1912.
1,099,640.
Patented June 9, 1914.
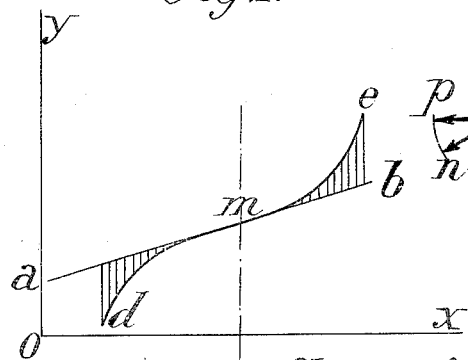
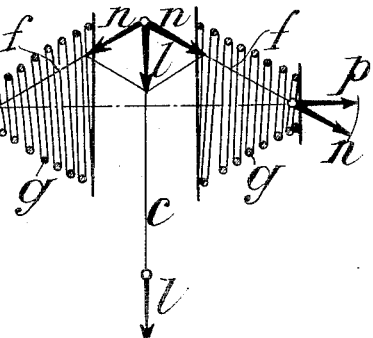
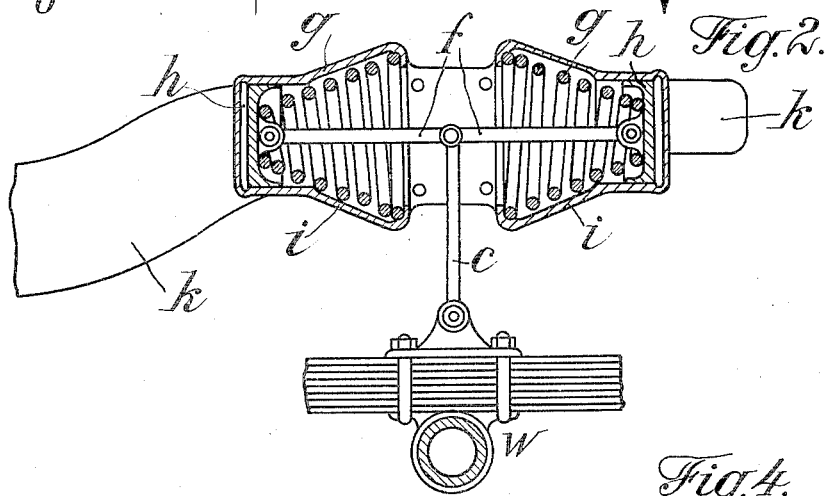
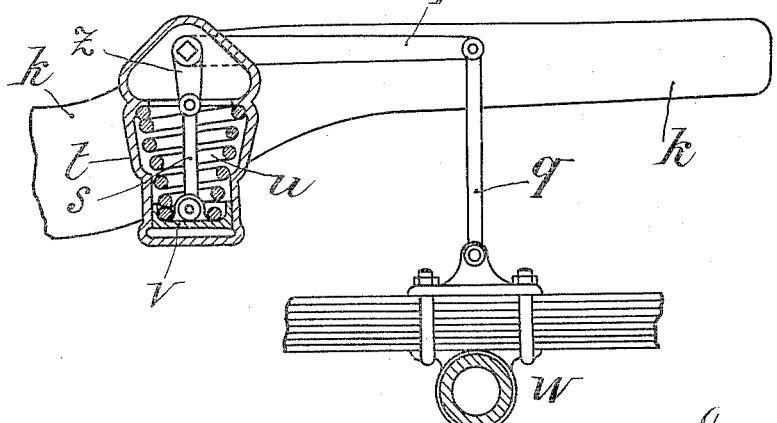
Witnesses:
Geo. T. Pinckney
Bertha M. Allen
Inventor:
Léon Dufour,
By Serrell + Son,
his Attorneys.

UNITED STATES PATENT OFFICE.

LÉON DUFOUR, OF GENEVA, SWITZERLAND.

SHOCK-ABSORBER.

1,099,640.  Specification of Letters Patent.  Patented June 9, 1914.

Application filed April 29, 1912. Serial No. 693,997.

*To all whom it may concern:*

Be it known that I, LÉON DUFOUR, engineer, a citizen of Switzerland, residing at Geneva, Canton of Geneva, in the Confederation of Switzerland, have invented certain new and useful Improvements in Shock-Absorbers, of which the following is a specification.

This invention relates to an apparatus to be employed with the springs commonly used to connect the bodies of vehicles to the axles thereof, and to co-act with such springs in absorbing the shocks caused by ruts and the unevenness of the road, and the construction of the apparatus made in accordance with my invention is such that with the same it is possible to employ relatively light ordinary springs and at the same time to reduce the vibrations of the vehicle body due to the shocks to a substantial minimum, and the construction of my improved apparatus will be hereinafter particularly described.

In the drawing, Figure 1 is a diagrammatic view illustrating, by a straight and a curved line, the relationship between the use of an ordinary vehicle spring and the same, together with my present invention, in absorbing the shock transmitted to the body of a vehicle from the unevenness of the road. Fig. 2 is a elevation and partial cross section illustrating one form of my present invention. Fig. 3 is a diagrammatic view illustrating the parts in another position, and Fig. 4 is an elevation and partial cross section illustrating a modified form of the invention.

In the use of an ordinary spring, as commonly employed to support the body of the vehicle upon the axles thereof, the distance that the spring is depressed and is caused to rebound and hence the movement of the vehicle body, when the wheels travel over an obstruction of any kind, varies ordinarily in a direct ratio with the amount or extent of the force applied. In other words, if as illustrated in Fig. 1, the distances of the wheel axle to any point of the vehicle frame are measured on a horizontal line $o$—$x$, and the forces or loads acting upon the vehicle frame, by a vertical line $o$—$y$ a straight line $a$—$b$ inclined upwardly from $a$ to $b$ will be obtained. If light springs are employed, that is to say springs which are curved considerably under the action of small loads, a straight line $a$—$b$ is obtained which forms a relative small angle with the horizontal line. In such a case, a delicate suspension is obtained and the shocks caused by the unevenness of or the ruts in the road will be weak. On the other hand, the oscillations of the frame will be very great and may become so great as to be dangerous. If heavy springs are employed, that is to say springs which yield but slightly under the action of large loads, a line $a$—$b$ will be obtained, forming a much larger angle to the horizontal line. In this case, a strong spring action will be obtained and the oscillations of the frame be very small, but the shocks of the road will be transmitted to the vehicle frame in a very disagreeable manner. As also shown in Fig. 1, the curve $d$—$m$—$e$ represents the line obtained by the use of the device of the present invention. The point $m$ on this curve represents the position of the frame under the action of a normal load.

As hereinbefore stated, the line $a$—$b$ is preferably obtained in the use of an ordinary light spring, and the angle at which the same is inclined to the line $o$—$x$ is small, and as the purpose of the present invention is to assist this ordinary spring in absorbing shocks, a line or curve $d$—$m$—$e$ represents the line obtained when the device of my invention is employed with the ordinary spring. The point $m$, being the point of intersection between the line $a$—$b$ and the curve $d$—$m$—$e$ and the curve, is such that that portion $m$—$e$ thereof is convexed downwardly, and that portion $d$—$m$ thereof is convexed upwardly.

Referring to Fig. 2, $k$—$k$ is the frame of a car and $w$ one of the wheel-axles. To this axle is connected a bracket to which is pivotally connected one end of a connecting rod $c$. The other end of the rod $c$ is pivotally connected to adjacent ends of connecting rods $f$. At their other ends the rods $f$ are pivotally connected with pistons $h$. The said pistons are slidably mounted in casings $i$, which are fixed to the frame $k$ of the vehicle. Between the piston $h$ and the casing $i$, and within the latter, are placed spiral springs $g$.

As shown in Fig. 2, the parts of the device are in their central position, corresponding to a normal or average load on the frame, and which position is represented by the point $m$ in Fig. 1. In this position, the connecting rods $f$ are at right angles to the connecting rod $c$. The rods $f$ are of equal length and the springs $g$ of equal force, and it will be readily understood that the rod $c$ is moved vertically whenever the axle $w$ is moved nearer to or removed from the frame $k$. The springs $g$ act in the line of the pistons in any position of the same, and the force or action of these springs increases whenever the pistons are moved toward the center of the device. In the central position, the axes of the rods $f$ coincide with the axes of the springs $g$, and both are at right angles to the rod $c$. Therefore the action of the springs $g$ on the rods $f$ will have no effect on the rod $c$. Consequently in this position, the device has no action at all on the frame, which is submitted only to the action of the usual suspension device. When, however, the frame is moved toward or withdrawn from the axle, the axes of the rods $f$ will no longer coincide with the axes of the springs $g$.

As shown in Fig. 3, the frame has been moved toward the axle. The springs $g$ now exert forces in the direction of arrows $p$ on the pistons. These forces, shown by arrows $p$, may be resolved in forces at right angles to the axes of the springs $g$ and in forces, shown by arrows $n$, in the direction of the connecting rods $f$. The two forces, shown by arrows $n$, will give in the direction of the connecting rod $c$ a resultant force, shown by arrow $l$, which will be added to the force exerted by the spring of the usual suspension device. By the construction of an analogous diagrammatic figure, it would be seen that whenever the frame is moved from the axle, the forces exerted by the reaction of the springs $g$ on the connecting rod $c$ are deducted or subtracted from those exerted by the spring of the usual suspension device. By considering various positions of the rod $c$, it will be seen that the forces, shown by arrows $l$, are not proportional to the changes of the distance of the frame from the axle. Near the central position corresponding to the point $m$, Fig. 1, and the horizontal position of the connecting rods (Fig. 2) the forces, shown by arrows $l$, will be very small even with very heavy springs $g$. These forces will increase at first very slowly, and with greater rapidity the greater the distance between the frame and the axle. The curve $d$—$m$—$e$ will be formed by the sum of the forces generated by the springs of the usual suspension device and the forces generated by the special device. This curve will intersect the line $a$—$b$ at $m$, the part $d$—$m$ of the same will be concave downward and the part $m$—$e$ be convex downward.

Fig. 4 of the drawings shows another form of the invention, wherein the axle $w$ of the car is pivotally connected to a rod $q$ which is pivotally connected at its opposite end with the lever $r$, and on the frame $k$ is fixed the casing $t$. In the said casing is slidably mounted a piston $v$ to which is pivotally connected one end of the connecting rod $s$. At its opposite end, the connecting rod is pivotally connected to the lever $z$ which is fixed to the lever $r$ or made integral therewith. Between the piston $v$ and the casing $t$ is placed a spiral spring $u$. The positions of the different parts shown in this figure are, as in the case of Fig. 2, the positions corresponding to a normal load of the vehicle. The lever $r$ is horizontal and the connecting rod $s$ and lever $z$ are vertical. The piston $v$ is in its lowest position and the spring $u$ under its lowest tension. Whenever the axle moves toward the frame, the lever $r$ is raised, the lever $z$ and the connecting rod $s$ are moved toward the right, the piston moves up and thus causes the spring to be compressed. Whenever the axle is moved from the frame, the lever $r$ swings downward, the lever $z$ and the connecting rod $s$ are moved toward the left, the piston is again moved up and the spring compressed. As in the foregoing case, the forces which are transmitted to the connecting rod $q$ from the spring $u$ will not be proportional to the distances of the frame from the axle. The curve $d$—$m$—$e$ will be the same as that obtained with the form of my invention as shown in Fig. 2.

I claim as my invention:

1. In a shock absorber and in combination with the spring connecting the body of a vehicle with its axle, of a casing secured to the vehicle body, a piston movable within the casing, a spring extending between the piston and the opposite end of the casing, a rod pivotally connected at one end of the said piston, a second rod pivotally connected at a fixed point at one end, the other ends of the said rods being pivotally connected together, and means for connecting the said rods with the axle of the vehicle so as to control the movement of the vehicle body relatively to its axle.

2. In a shock absorber, and in combination with the spring connecting the body of a vehicle with its axle, a pair of casings secured to the vehicle body, a piston movable within each casing, a rod for each piston, each rod being pivotally connected at one end to its piston, a link pivotally connected at one end to the opposite ends of said rods, and pivotally connected through suitable means at its other end of the axle of the vehicle, and a spring in each casing, each spring bearing at one end against the casing and at its opposite end against the piston within that casing.

In testimony whereof I affix my signature in presence of two witnesses.

LÉON DUFOUR.

Witnesses:
  LOUIS H. MUNIER,
  MAURICE GRUER.